United States Patent [19]
Wu et al.

[11] Patent Number: 5,596,047
[45] Date of Patent: Jan. 21, 1997

[54] WATER-DISPERSIBLE AND CURABLE WATERBORNE COMPOSITIONS CONTAINING 1,3,5-TRIAZINE CARBAMATES

[75] Inventors: Kuang J. Wu, Easton; Richard Quinn, Bethel, both of Conn.

[73] Assignee: Cytec Technology Corp., Wilmington, Del.

[21] Appl. No.: 340,950

[22] Filed: Nov. 16, 1994

[51] Int. Cl.⁶ ........................................ C08F 8/32
[52] U.S. Cl. ........................................ 525/375
[58] Field of Search ............................... 525/375

[56] References Cited

U.S. PATENT DOCUMENTS

| | | | |
|---|---|---|---|
| 4,557,734 | 12/1985 | Schwab et al. | 44/53 |
| 4,595,512 | 6/1986 | Tellier et al. | 252/8.55 C |
| 4,663,377 | 5/1987 | Homback et al. | 524/196 |
| 4,939,213 | 7/1990 | Jacobs, III et al. | 525/329.9 |
| 5,075,370 | 12/1991 | Kubitza et al. | 524/591 |
| 5,084,541 | 1/1992 | Jacobs, III et al. | 528/45 |
| 5,252,696 | 10/1993 | Laas et al. | 528/49 |
| 5,288,865 | 2/1994 | Gupta | 544/200 |
| 5,342,878 | 8/1994 | Das et al. | 524/558 |

FOREIGN PATENT DOCUMENTS

| | | |
|---|---|---|
| A12077633 | 3/1993 | Canada . |
| 0369389A1 | 5/1990 | European Pat. Off. . |
| 0516277A1 | 12/1992 | European Pat. Off. . |
| 568134A1 | 11/1993 | European Pat. Off. . |
| 0604922A1 | 7/1994 | European Pat. Off. . |
| 0624577A1 | 11/1994 | European Pat. Off. . |
| 1530021 | 10/1978 | United Kingdom . |
| 1530022 | 10/1978 | United Kingdom . |
| 2018796 | 10/1979 | United Kingdom . |

OTHER PUBLICATIONS

Ser. No. 08/138,581 filed Oct. 15, 1993.
Ser No. 08/239,009 filed May 6, 1994.
Ser. No. 08/286,835 filed Aug. 5, 1994.
Ser. No. 08/324,549 filed Oct. 18, 1994.

*Primary Examiner*—Edward J. Cain
*Attorney, Agent, or Firm*—Bart E. Lerman; Claire M. Schultz; Michael J. Kelly

[57] ABSTRACT

Waterborne coating compositions, methods of preparing the same and uses thereof are disclosed. The present waterborne coating compositions include an active hydrogen-containing surface active resin and a 1,3,5-triazine carbamate crosslinker dispersed in an aqueous medium, and are preferably formulated to be applied by spraying for use in automotive OEM applications.

48 Claims, No Drawings

1

WATER-DISPERSIBLE AND CURABLE WATERBORNE COMPOSITIONS CONTAINING 1,3,5-TRIAZINE CARBAMATES

BACKGROUND OF THE INVENTION

1. Field of the Invention

This invention relates generally to waterborne coating compositions containing 1,3,5-triazine carbamate crosslinkers, methods of preparing such coatings, water-dispersible compositions suitable for use in preparing such coatings, and articles coated therewith.

2. Description of Related Art

Various derivatives of amino-1,3,5-triazines are described in the literature for use in a wide variety of fields. Certain of these derivatives, such as alkoxymethyl derivatives of melamine and guanamines, are useful as crosslinkers or reactive modifiers in curable compositions which contain resins having active hydrogen groups. While alkoxymethylated melamines and guanamines provide excellent results in a number of aspects, they also have the disadvantage of releasing formaldehyde as a volatile byproduct under curing conditions. It has long been a desire of industry to find acceptable alternative crosslinkers which do not emit formaldehyde upon cure.

One such alternative group of crosslinkers-which show great promise are the 1,3,5-triazine carbamates which are disclosed in one or more of commonly owned U.S. Pat. No. 4,939,213, U.S. Pat. No. 5,084,541, U.S. Pat. No. 5,288,865, EP-A-0604922 (corresponding to U.S. application Ser. No. 07/998,313 (filed Dec. 29, 1992)), EP-A-0624577 (corresponding to U.S. application Ser. No. 08/061,905 (filed May 14, 1993)), U.S. application Ser. No. 08/138,581 (filed Oct. 15, 1993), U.S. application Ser. No. 08/239,009 (filed May 6, 1994), U.S. application Ser. No. 08/286,835 (filed Aug. 5, 1994) and U.S. application Ser. No. 08/324,549 (filed Oct. 18, 1994), all of which are hereby incorporated by reference herein for all purposes as if fully set forth. The 1,3,5-triazine carbamates disclosed in these references are believed to react with active hydrogen group-containing resins in a manner similar to blocked isocyanates, and have been found to be particularly useful as crosslinkers in coating compositions based upon hydroxy-functional resins, with the cured coatings possessing a wide range of desirable properties. Among the most desirable properties are lowered (or zero) formaldehyde emission upon cure, and improved acid etch resistance in the cured films.

In a number of the previously incorporated references, it is disclosed that curable compositions containing polyfunctional active hydrogen-containing polymers and 1,3,5-triazine carbamate crosslinkers can be adapted for use in organic solvent-based and powder coating compositions. For example, in previously incorporated EP-A-0604922 (U.S. application Ser. No. 07/998,313) are disclosed organic solvent-based coatings prepared from tin- and acid-catalyzed systems using 1,3,5-triazine carbamate crosslinkers. Also disclosed therein are the use of the 1,3,5-triazine carbamates as co-crosslinkers in combination with conventional amino resin crosslinkers to improve the acid etch resistance, and lower formaldehyde emission, of traditional organic solvent-based amino resin crosslinked systems.

Despite the excellent films which can be achieved with these systems, the coatings industry is under great pressure to reduce the environmentally undesirable emission of volatile organic compounds (VOC), which includes the organic solvent media. One means of doing so, of course, would be to exchange some or all of the liquid organic solvent medium with water. Although it is generally disclosed that curable compositions containing the 1,3,5-triazine carbamate crosslinkers may be adapted for use in water-based systems, the switch from organic solvents to water is neither a simple nor straightforward matter, particularly in the case of 1,3,5-triazine carbamates which are substantially hydrophobic and substantially non-dispersible in water.

A specific disclosure of the use of 1,3,5-triazine carbamates in waterborne systems can be found in previously incorporated U.S. Pat. No. 4,939,213 and U.S. Pat. No. 5,084,541, in which is described (example 9) an aqueous electrocoating bath (containing about 10% solids) prepared by combining a typical cationic electrodepositon resin, tris-(2-ethylhexyloxycarbonylamino)-1,3,5-triazine (as crosslinker), lactic acid (neutralizing agent), dibutyltindilaurate (catalyst) and water. Such electrodeposition coatings are generally cationic, low solids systems which are not suitable for application by conventional spray technology.

There is, thus, clearly a need for low VOC curable coating compositions employing 1,3,5-triazine carbamate crosslinkers, and particularly those which are adapted to be applied by conventional spray technology such as utilized in automotive original equipment manufacture (OEM) and general industry applications.

SUMMARY OF THE INVENTION

The present invention meets the aforementioned industry need by providing, in its overall concept, waterborne coating compositions comprising an aqueous medium having substantially homogeneously dispersed therein:

(1) a reactive resin component comprising an active hydrogen-containing surface active resin which possesses sufficient anionic hydrophilizing functionality to render the active hydrogen-containing surface active resin water dispersible; and (2) a crosslinker component comprising a 1,3,5-triazine carbamate crosslinker.

Such waterborne coating compositions may be prepared by combining the components of the coating in any particular order, but it is preferred to do so by the following method:

(A) preparing a dispersible composition by substantially homogeneously mixing (1) a reactive resin component comprising an active hydrogen-containing surface active resin possessing an amount of anion generating functionality which, upon neutralization, is sufficient to render the dispersible composition water dispersible, and (2) a crosslinker component comprising a 1,3,5-triazine carbamate crosslinker; and (B) dispersing the dispersible composition in an aqueous medium, whereby prior to or concurrently with step (B), the anion generating functionality on the active hydrogen-containing surface active resin is sufficiently neutralized so as to render the dispersible composition water dispersible. The waterborne coating compositions prepared by this method thus comprise an aqueous medium having substantially homogeneously dispersed therein a dispersible composition comprising a substantially homogenous mixture of (1) a reactive resin component comprising an active hydrogen-containing surface active resin which possesses an amount of anionic hydrophilizing functionality sufficient to render the dispersible composition water dispersible, and (2) a crosslinker component comprising a 1,3,5-triazine carbamate crosslinker.

In addition to the active hydrogen-containing resin and the 1,3,5-triazine crosslinker, the waterborne coating compositions of the invention may contain a number of optional ingredients depending, for example, on the various starting components, desired end use, application methods and other variables recognized by those of ordinary skill in the relevant art. This is discussed in further detail below.

The waterborne coating compositions in accordance with the present invention may be utilized in a wide variety of fields. A particularly preferred end use is as a one- or two-component sprayable coating for elevated temperature cure applications such as, for example, automotive OEM clearcoats or pigmented basecoats. As compared to organic solvent-based counterparts, significant reductions in VOC and formaldehyde emissions can be achieved without loss of ultimate film properties.

These and other features of the present invention will be more readily understood by those skilled in the art from a reading of the following detailed description.

DETAILED DESCRIPTION OF THE PREFERRED EMBODIMENTS

The 1,3,5-Triazine Carbamate Crosslinkers

The 1,3,5-triazine carbamate crosslinkers suitable for use in the present invention are materials known from the previously incorporated references. Preferred for use in the present invention are those 1,3,5-triazine carbamates of the following general formula, as well as oligomers thereof:

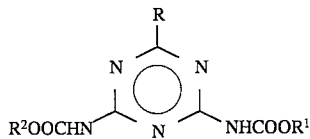

wherein R is selected from the group consisting of —NHCOOR$^3$, hydrogen, hydrocarbyl, hydrocarbyloxy, hydrocarbylthio, amido, sulfonamido, amino hydrocarbylamino, dihydrocarbylamino and cyclic amino; and each R$^1$, R$^2$ and R$^3$ is independently selected from the group consisting of hydrocarbyl, hydroxyhydrocarbyl, hydrocarbyloxyhydrocarbyl and hydroxyhydrocarbyloxyhydrocarbyl.

The term "hydrocarbyl" in the context of the present invention, and in the above formula, is a group which contains carbon and hydrogen atoms and includes, for example, alkyl, aryl, aralkyl, alkenyl, and substituted derivatives thereof.

In more preferred embodiments, R is selected from —NHCOOR$^3$; hydrogen; hydrocarbyl groups having from 1 to 20 carbon atoms such as alkyl (e.g., methyl), phenyl, cycloalkyl (e.g., cyclohexyl), alkenyl (e.g., vinyl), aralkyl (e.g., benzyl) and the like; hydrocarbyloxy groups having from 1 to 20 carbon atoms such as alkoxy (e.g., methoxy), aryloxy (e.g., phenoxy) and the like; hydrocarbylthio groups having 1 to 20 carbon atoms such as methylthio, phenylthio and the like; amido groups such as acetamido; sulfonamido groups such as benzene sulfonamido; a amino group; hydrocarbylamino groups of 1–20 carbon atoms such as methylamino, butylamino and the like; dihydrocarbylamino groups of 2–40 carbon atoms such as dimethylamino; and cyclic amino groups such as pyrrolidino, piperidino, morpholino, azepino and the like. Especially preferred is when R is —NHCOOR$^3$.

As preferred groups R$^1$, R$^2$ and R$^3$ may be mentioned, for example, hydrocarbyl groups having from 1 to 20 carbon atoms such as alkyl (e.g., methyl), phenyl, cycloalkyl (e.g., cyclohexyl), alkenyl (e.g., vinyl), aralkyl (e.g., methyl phenyls) and the like; hydroxyhydrocarbyl groups having from 1 to 20 carbon atoms such as hydroxyalkyl (e.g., methylol), hydroxyaryl (e.g., hydroxyphenyl) and the like; hydrocarbyloxyhydrocarbyl groups having from 2 to 40 carbon atoms, the hydrocarbyl being as described above; and hydroxyhydrocarbyloxyhydrocarbyl groups having from 2 to 40 carbon atoms, the hydrocarbyl and hydroxyhydrocarbyl being as described above. Further, these groups may also have a substituent such as a halogen atom, a cyano group, a sulfoxide group, a sulfone group, a carbonyl group, an ester group, and an amide group. Mixtures of the above are also suitable.

Preferred of the above for R$^1$, R$^2$ and R$^3$ are the aliphatic linear alkyls and alkenyls having 1 to 8 carbon atoms, cyclic alkyls and alkenyls having from 4 to 12 carbon atoms, alkoxyalkyls having from 2 to 16 carbon atoms, and aryl and alkaryls having 6 to 18 carbon atoms, as well as mixtures thereof. As specific preferred examples may be mentioned methyl, ethyl, propyl, n-butyl, i-butyl, t-butyl, pentyl, hexyl, cyclohexyl, heptyl, octyl, ethylhexyl, allyl, ethoxyethyl, hydroxyethoxyethyl, 1-methoxy-2-propyl, phenyl, 2-methyl phenyl, 3-methyl phenyl, 4-methyl phenyl, dimethylphenyls, 2-chlorophenyl, 3-chlorophenyl, 4-chlorophenyl and mixtures thereof.

An especially preferred characteristic of the 1,3,5-triazine crosslinkers is that they be substantially hydrophobic, that is, substantially non-dispersible in water without the aid of a surface active material, e.g., the active hydrogen-containing surface active resin.

Especially preferred 1,3,5-triazine carbamate crosslinkers for use in this invention are those of the above formula wherein R is —NHCOOR$^3$, and R$^1$, R$^2$ and R$^3$ are independently selected from methyl and butyl, which includes tris-(methoxybutoxycarbonylamino)-1,3,5-triazine, tris-(butoxycarbonylamino)-1,3,5-triazine and tris-(methoxycarbonylamino)-s-triazine.

These 1,3,5-triazine carbamates may be prepared, for example, by the methods described in the previously incorporated U.S. Pat. No. 4,939,213, U.S. Pat. No. 5,084,541, U.S. Pat. No. 5,288,865, EP-A-0624577 (U.S. application Ser. No. 08/061,905 (filed May 14, 1993)), U.S. application Ser. No. 08/138,581 (filed Oct. 15, 1993), U.S. application Ser. No. 08/239,009 (filed May 6, 1994), U.S. application Ser. No. 08/286,835 (filed Aug. 5, 1994) and U.S. application Ser. No. 08/324,549 (filed Oct. 18, 1994), and reference may be had thereto for further details.

The Active Hydrogen-Containing Surface Active Resin

The active-hydrogen-containing surface active resin contains both (i) active hydrogen functionality capable of reacting with the carbamate groups of the 1,3,5-triazine carbamates, as well as (ii) an amount of anion generating functionality which, upon neutralization, is at least sufficient to render the resin water dipersible. In addition to the anion generating functionality, the active hydrogen-containing surface active resin may also contain hydrophilic non-ionic functionality to aid in water dispersibility. The anionic and non-ionic functionalities are sometimes collectively referred to herein as the hydrophilizing functionality or hydrophilizing groups. In this manner, the active hydrogen-containing surface active resin acts as a surfactant for the 1,3,5-triazine carbamate crosslinker and other optional hydrophobic components of the inventive waterborne coatings and, in the final film, the surface active resin is incorporated into the crosslinked network by virtue of its reactivity with the crosslinker, leading to improved water resistance as compared to utilizing non-reactive surfactants.

The preferred active hydrogen-containing surface active resin is polymeric in nature, with the hydrophilizing groups and active hydrogen-containing functionality being incorporated into the polymer via appropriate monomer selection or subsequent modification. As examples of such may be mentioned olefinic copolymers based on carboxyfunctional ethylenically unsaturated monomers and hydroxyfunctional ethylenically unsaturated monomers; polyesters based on polybasic carboxylic acids and polyhydric alcohols; polyurethanes based on polyisocyanates, polyhydric alcohols (or polyhydric prepolymers) and hydroxy acids; polyepoxy esters; and the like. Especially preferred for use in the present invention are the olefinic copolymers and polyesters.

Active hydrogen-containing functionality, as utilized herein, refers to functional groups which contain active hydrogens reactive with the carbamate groups (or functionality which may be generated by the carbamate groups under cure conditions, such as isocyanate functionality) of the 1,3,5-triazine carbamates under cure conditions of the coatings. Such active hydrogen-containing functionality is generally well known to those skilled in the coatings art and includes, most commonly, hydroxyl and amino groups. Hydroxyl is typically utilized in anionically stabilized coatings and is preferred for use in the present invention.

The anionic and non-ionic hydrophilizing functionality is also generally well known to those skilled in the coatings art. By anion generating is meant functionality such as carboxyl which, when appropriately neutralized, becomes hydrophilic in nature. Hydrophilic non-ionic functionality is, in and of itself, hydrophilic in nature. The amount of hydrophilizing functionality present in the resin should, upon at least partial neutralization of the anion generating functionality, be sufficient to render the resin (and preferably the total dispersible composition) water dispersible.

Besides the aforementioned carboxyl groups, other examples of suitable groups which generate anions upon neutralization include sulfonic and phosphoric groups. As examples of suitable hydrophilic non-ionic functionality may be mentioned amine oxide, phosphine oxide, alkyl or aryl phosphate, and polyether (polyethylene oxide).

Preferred hydrophilizing groups for most applications are those which generate anions upon neutralization and, particularly, the carboxyl and sulfonic groups. Especially preferred are carboxyl groups.

Such active hydrogen-containing surface active resins are generally well-known to those of ordinary skill in the art as exemplified, for example, in GB1530022, EP-A-0568134, U.S. Pat. No. 5,075,370 and U.S. Pat. No. 5,342,878, all of which are incorporated by reference herein for all purposes as if fully set forth.

As a specific preferred example of an active hydrogen-containing resin may be mentioned copolymers of (meth)acrylic acid, hydroxyalkyl (meth)acrylates and, optionally, other free-radically polymerizable monomers which, when polymerized, possesses the following characteristics:

a number average molecular weight (Mn) of from about 1000 to about 50000, and preferably from about 1000 to about 12000;

an acid number of from about 15 to about 150 mg KOH/g resin, preferably from about 20 to about 70 mg KOH/g resin, and especially from about 20 to about 35 mg KOH/g resin (100% solids basis) and an amount of hydroxyl groups of from about 2.5 wt % to about 6 wt %, preferably from about 3 wt % to about 5 wt %, and especially from about 3.5% to about 4.5 wt % (100% solids basis).

Production of these active hydrogen-containing resins, as exemplified by the incorporated references, is well-known to those skilled in the relevant art and need not be discussed further.

In order to render the active hydrogen-containing surface active resin water dispersible, the anion generating groups present on the resin must at least in part be neutralized. Suitable neutralizing agents for accomplishing this are well-known to those of ordinary skill in the art and include, for example, organic and inorganic bases such as sodium and potassium hydroxide, sodium and potassium carbonate, and amines such as ammonia, primary, secondary and tertiary amines. Tertiary amines and ammonia are preferred, with triethylamine being especially preferred.

Optional Ingredients

In addition to the active hydrogen-containing surface active resin and 1,3,5-triazine carbamate crosslinker described in detail above, the waterborne coating compositions of the present invention may optionally comprise a variety of additional ingredients.

For example, the reactive resin component may include other non-dispersible reactive resins which, along with the 1,3,5-triazine carbamate crosslinker, is dispersed in the aqueous medium via the action of the active hydrogen-containing surface active resin. As examples thereof may be mentioned similar types of active hydrogen-containing resins as described above, but without the hydrophilizing functionality. Such resins are well-known to those skilled in the art, as exemplified in previously incorporated U.S. Pat. No. 4,939,213 and U.S. Pat. No. 5,084,541.

The crosslinker component may optionally contain other crosslinking agents and, particularly, active-hydrogen reactive crosslinking agents such as, for example, amino resins and polyisocyanates (both blocked and unblocked).

As suitable amino resins may be mentioned the partially or substantially fully methylolated, partially or substantially fully etherified amino compounds based on melamine, guanamines, glycolurils and urea. In general, such amino compounds are well-known to those of ordinary skill in the art (see, for example, previously incorporated EP-A-604922) and are generally commercially available. They include, most commonly, melamines, guanamines such as benzo-, aceto-, and cyclohexylcarbo-guanamines, glycolurils and ureas, as well as the at least partially N-alkylolated and N-alkoxyalkylated derivatives thereof. The term "amino compound" also includes the oligomers of such amino compounds.

As suitable melamine-based amino resins may be mentioned those of the following general formula

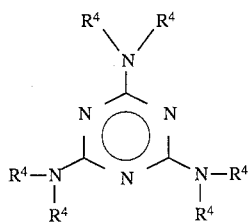

wherein each $R^4$ is independently selected from H, an alkylol group and an alkoxyalkyl group. Preferred melamines are those wherein each $R^4$ is independently selected from H, a methylol group and an alkoxymethyl group having from 1 to 8 carbon atoms in the alkoxy group.

As suitable guanamine-based amino resins may be mentioned those of the following general formula

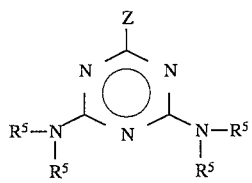

wherein Z is selected from H, an alkyl group of from 1 to 20 carbon atoms, an aryl group of from 6 to 20 carbon atoms, and an aralkyl group of from 7 to 20 carbon atoms, and wherein each $R^5$ is independently selected from H, an alkylol group and an alkoxyalkyl group. Preferred guanamines are those wherein each $R^5$ is independently selected from H, a methylol group and an alkoxymethyl group having from 1 to 8 carbon atoms in the alkoxy group, and particularly wherein Z is selected from a phenyl group (benzoguanamines), a methyl group (acetoguanamines) and a cyclohexyl group (cyclohexylcarboguanamines).

As suitable glycoluril-based amino resins may be mentioned those of the following general formula

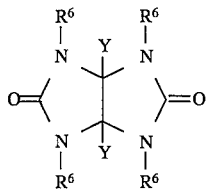

wherein Y is selected from H, an alkyl group of from 1 to 20 carbon atoms, an aryl group of from 6 to 20 carbon atoms, and an aralkyl group of from 7 to 20 carbon atoms, and wherein each $R^6$ is independently selected from H, an alkylol group and an alkoxyalkyl group. Preferred glycolurils are those wherein each $R^6$ is independently selected from H, a methylol group and an alkoxymethyl group having from 1 to 8 carbon atoms in the alkoxy group.

As suitable urea-based amino resins may be mentioned those of the following general formula

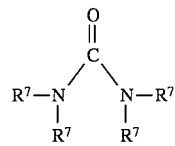

wherein each $R^7$ is independently selected from H, an alkylol group and an alkoxyalkyl group. Preferred ureas are those wherein each $R^7$ is independently selected from H, a methylol group and an alkoxymethyl group having from 1 to 8 carbon atoms in the alkoxy group.

As specific examples of commercially available amino resins of the type described above may be mentioned those sold under the trademarks CYMEL® and BEETLE® of Cytec Industries, Inc. (West Paterson, N.J.).

Polyisocyanate crosslinking agents, including blocked forms thereof, are generally well known in the art and have been extensively used in coating compositions in a monomeric, oligomeric and/or polymeric form. To function as an effective crosslinking agent, the polyisocyanate must have at least two reactive isocyanate groups. As specific examples of such may be mentioned hexamethylene diisocyanate; 2,2,4-trimethylhexamethylene diisocyanate; 2,4,4-trimethylhexamethylene diisocyanate; meta-α,α,α',α'-tetramethylxylylenediisocyanate (commercially available under the trade designation m-TMXDI® aliphatic isocyanate from Cytec Industries Inc., West Paterson, N.J.); para-α,α,α',α'-tetramethylxylylenediisocyanate (available under the trade designation p-TMXDI® aliphatic isocyanate from Cytec Industries Inc., West Paterson, N.J.); 1-isocyanato-3,3,5-trimethyl-5-isocyanatomethyl cyclohexane (isophorone diisocyanate, abbreviated as IPDI); bis(4-isocyanatocyclohexyl)methane (hydrogenated MDI); biuret derivatives of various diisocyanates including, for example, hexamethylene diisocyanate (commercially available under the trade designation Desmodur® N of Miles Inc., Pittsburgh, Pa.); uretdione derivatives of various diisocyanates including, for example, hexamethylene diisocyanate and IPDI; isocyanurate derivatives of various diisocyanates including, for example, hexamethylene diisocyanate (commercially available under the trade designation Desmodur® N 3390 of Miles Inc., Pittsburgh, Pa.) and IPDI (commercially available under the trade designation IPDI® T 1890 polyisocyanate of Huls America, Inc., Piscataway, N.J.); and urethane adducts of diisocyanates with polyols such as, for example, ethylene glycol, propylene glycol, neopentyl glycol, trimethylolpropane, pentaerythritol and the like, as well as oligomeric and polymeric polyols, for example, the 3:1 meta-α,α,α',α'-tetramethylxylylenediisocyanate/trimethylolpropane adduct (commercially available under the trade designation CYTHANE® 3160 aliphatic polyisocyanate of Cytec Industries Inc., West Paterson, N.J.), and the 3:1 IPDI/trimethylolpropane adduct (commercially available under the trade designation SPENLITE® P 25-A4-60 aliphatic urethane prepolymer of Reichhold Chemicals, Research Triangle Park, N.C.).

Because the systems of the present invention are waterborne, the polyisocyanates should normally be blocked, and particularly those which are more reactive. Blocking agents therefor are also well-known and include, for example, lower alkyl alcohols and oximes. Stable systems having a potlife of from 8 hours to a few days, however, can be formulated under certain conditions with selected unblocked polyisocyanates, and particularly the adduct or derivative polyisocyanates based on diisocyanates containing at least one non-primary isocyanate group, such as the isocyanurate derivatives of IPDI, the 3:1 meta-$\alpha,\alpha,\alpha',\alpha'$-tetramethylxylylenediisocyanate/trimethylolpropane adduct, and the 3:1 IPDI/trimethylolpropane adduct mentioned above.

Cure catalysts for 1,3,5-triazine carbamate crosslinked systems, as exemplified by previously incorporated U.S. Pat. No. 4,939,213, U.S. Pat. No. 5,084,541 and EP-A-0604922 (U.S. application Ser. No. 07/998,313 (filed Dec. 29, 1992)), include acidic and organometallic catalysts of the type well-known to those skilled in the relevant coatings art. As examples of acidic catalysts may be mentioned sulfonic acids (such as p-toluene sulfonic acid or dodecyl benzene sulfonic acid), aryl and alkyl acid-phosphates and pyrophosphates, carboxylic acids, sulfonimides and mineral acids. Latent acidic catalysts, such as amine-blocked p-toluene sulfonic acid or amine-blocked dodecyl benzene sulfonic acid, are included within the meaning of acidic catalysts. As examples of organometallic catalysts may be mentioned organotin compounds such as dibutyltin di-2-ethylhexoate, dibutyltin diisooctyl maleate, dibenzyltin di-2-ethylhexoate, dibutyltin dilaurate, dimethyltin dilaurate, tetrabutyl diacetoxy distannoxane, tetramethyl diacetoxy distannoxane, tetrapropyl diacetoxy distannoxane, dibutyltin dichloride, and the like.

If an amino resin co-crosslinker is utilized with the 1,3,5-triazine carbamate crosslinker, an acid catalyst will be most suitable. If a polyisocyanate is utilized with the 1,3,5-triazine carbamate crosslinker, an organometallic catalyst will be most suitable. Again, however, cure catalysts are optional in the present systems and, when utilized, are generally added in amounts ranging from about 0.001 wt % to about 5 wt %, and preferably up to about 3 wt %, based on the combined weight of the reactive resin and crosslinker components.

Although it is not preferred, the present waterborne coating compositions may also contain minor amounts of co-solvents of the type typically found in coatings applications including, for example, alcohols, ketones, esters, aliphatic hydrocarbons, aromatic hydrocarbons, halogenated hydrocarbons and the like.

In one especially preferred embodiment, it has surprisingly been found that the present waterborne coating compositions which are insufficiently stable (tendency for precipitate formation) can be stabilized by a material which is non-polymeric in nature (e.g., monomeric or oligomeric), has a hydrophilic portion, but which in and of itself is substantially hydrophobic (i.e., it is substantially insoluble in water and water is substantially insoluble in it). Without wishing to be bound by any particular theory, it is believed that the hydrophobic portion of this "aqueous dispersion-promoting material" interacts with one of the components, for example hydrogen bonds to the 1,3,5-triazine carbamate, while the hydrophilic portion interacts with the other component, for example interacts with the hydrophilic functionality of the active hydrogen-containing surface active resin. As a result, when the active hydrogen-containing surface active resin is rendered water-dispersible by, e.g., adding a base, and the total dispersible composition remains stably dispersed in the aqueous medium for extended periods.

Materials which qualify as aqueous dispersion-promoting materials can be readily identified by those of skilled in the art by a simple comparison of the "stability life" (the time to precipitate formation) of identically formulated waterborne coating compositions with the exception that one of such waterborne coatings contains the potential aqueous dispersion-promoting material. If the stability life is substantially extended (preferably at least doubled) by the use of the material, that material qualifies as an aqueous dispersion-promoting material hereunder.

Materials which have been found to satisfy the requirements for such aqueous dispersion-promoting materials generally are organic compounds having:

(i) a hydrophobic portion such as a relatively long alkyl chain (which may, for example, contain ester and/or ether linkage in the chain), preferably such an alkyl chain having at least 8 carbon atoms, or an aromatic group, and (ii) a hydrophilic portion such as an anionic or hydroxyl group.

Preferred are an organic compound with such an alkyl chain or aromatic group substituted with the hydrophilic group. This includes, for example, long-chain aliphatic alcohols (e.g., ethylhexanol, octanol, dodecanol, and the like); benzyl alcohol and other aromatic alcohols; ester-alcohols (e.g., hydroxyalkyl esters of alkanoic acids); and the like. Especially preferred are the long chain alkyl alcohols having at least 8 carbon atoms, such as ethylhexanol, and hydroxyalkyl esters of alkanoic acids containing a total of at least 8 carbon atoms, such as a $C_8$-hydroxyalkyl esters of methylpropionic acid commercially available from Eastman Chemical Company under the trade designation Texanol®.

The amount of aqueous dispersion-promoting material required depends on factors such as the type of active hydrogen-containing surface active resin, its functionality, the type and functionality of the 1,3,5-triazine carbamate, the presence of additional resins and co-crosslinkers, and other factors which will be readily recognized by those of ordinary skill in the art. As a general rule, a sufficient amount is incorporated to more stably disperse the 1,3,5-triazine carbamate crosslinker in the system. Preferably, the amount of such aqueous dispersion-promoting material should not exceed 40 wt %, and especially less than 30 wt %, based on the combined weight of the resin and crosslinker components. Of course, it is most preferred to use the least amount necessary to achieve the desired stability life.

Depending on their end use, the waterborne coating compositions of the present invention may also comprise other well known auxiliaries and additives typically utilized in the coatings industry including, for example, foam inhibitors, levelling aids, pigments, pigment dispersing aids, dyes, UV absorbers and other stabilizing additives, and the like. These other additives are well known to those skilled in the relevant art and need not be discussed further.

Preparation of Coatings

As discussed previously, the waterborne coating compositions of the present invention may be prepared by combining the components of the coating in any particular order, but it is preferred to do so by the following method:

(A) preparing a dispersible composition by substantially homogeneously mixing
  (1) a reactive resin component comprising an active hydrogen-containing surface active resin possessing an amount of anion generating functionality which, upon neutralization, is sufficient to render the dispersible composition water dispersible, and
  (2) a crosslinker component comprising a 1,3,5-triazine carbamate crosslinker; and (B) dispersing the dispersible composition in an aqueous medium, whereby prior to or concurrently with step (B), the anion generating functionality on the active hydrogen-containing surface active resin is sufficiently neutralized so as to render the dispersible composition water dispersible.

The waterborne coating compositions prepared by this method thus comprise an aqueous medium having substantially homogeneously dispersed therein a dispersible composition comprising a substantially homogenous mixture of (1) a reactive resin component comprising an active hydrogen-containing surface active resin which possesses an amount of anionic hydrophilizing functionality sufficient to render the dispersible composition water dispersible, and (2) a crosslinker component comprising a 1,3,5-triazine carbamate crosslinker.

The aqueous medium may comprise solely water or may, as indicated above, contain other components such as the neutralizing agent. Other than the neutralizing agent, the aqueous medium may also include the various optional ingredients, for example, minor amounts of water-miscible co-solvents to ease dispersion or adjust viscosity, although this is not preferred. Instead, it is preferred that the various optional ingredients be incorporated into the dispersible composition before being dispersed in the aqueous medium. It is further preferred that the neutralizing agent be incorporated into the dispersible composition before being dispersed in water.

Although the 1,3,5-triazine carbamate crosslinker and the active hydrogen-containing surface active resin can be employed in varying amounts, when these components comprise the primary film-forming components of a subsequently formed coating, it is preferred that they be present in the coating compositions in amounts such that the carbamate:active hydrogen functionality ratio is in the range of from about 0.5:1 to about 2:1, and especially in the range of from about 0.8:1 to about 1.2:1. When other active hydrogen-containing resins and/or co-crosslinkers are employed, it is preferred that the overall active hydrogen reactive:active hydrogen functionality ratio be within the above indicated ranges.

The waterborne coating compositions may be formulated to various solids contents, generally ranging from about 20% to about 75% by weight solids, but preferably in the range of from about 30% to about 55% by weight solids, depending on the method of application chosen. The preferred method of application, as explained below, is by spraying, and one skilled in the art can, with the aid of the present description, formulate the inventive waterborne coating compositions so as to be spray applicable.

Coating Methods and Uses

Any conventional coating method may be employed; however, especially preferred systems in accordance with the present invention are formulated for spray application.

Such sprayable waterborne coating compositions may be utilized in a wide variety of fields. A particularly preferred end use is as a one- or two-component coating for elevated temperature cure applications such as, for example, automotive OEM clearcoats or pigmented basecoats. Other potential applications include, for example, coatings for wire, appliances, furniture, pipes, machinery and the like. Suitable substrates include glass, temperature resistant plastics, and metals such as steel and aluminum.

As just indicated, the curable waterborne coating compositions of this invention cure at elevated temperatures, typically in the range of from about 90° C. to about 200° C.

The foregoing discussion of the present invention will be further exemplified by the following examples offered by way of illustration and not limitation one the scope thereof. In these examples, unless otherwise stated, the acid numbers and hydroxyl group contents are reported on an "as is" basis, but may be easily converted to a 100% solids basis.

EXAMPLE 1

Preparation of Acrylic Resin in Texanol®

73 grams of Texanol®, an ester-alcohol solvent available from Eastman Chemical having the formula $(CH_3)_2CHCOOCH_2C(CH_3)_2CHOHCH(CH_3)_2$, was added to a 500 milliliter reactor equipped with a stirrer, a reflux condenser, and a thermocouple under a blanket of nitrogen, and heated in an oil bath to 105° C. The Texanol® ester-alcohol was titrated as having a hydroxy content of 2.5 weight % and an acid number of 0.3 mg KOH/g of material. A monomer feed mixture (103 grams total) consisting of butyl acrylate (48.38 weight %), 2-hydroxyethyl acrylate (21.07 weight %), methyl methacrylate (20.46 weight %), acrylic acid (6.16 weight %), 2,2'-azobis-2-methylbutyronitrile (2.97 weight %), and 1-octanethiol (0.96 weight %) was added to the reactor over 130 minutes. During this period, the temperature of the reaction mixture reached a maximum of 107° C. After an additional 8 minutes, 1.21 grams of a 42.7 weight % solution of 2,2'azobis-2-methylbutyronitrile in Texanol® ester-alcohol was charged to the reactor, and the reaction mixture was stirred at a temperature of 103°–107° C. for an additional 67 minutes to produce a carboxyfunctional acrylic polyol as the reaction product. The solids content of the product was 58.6 weight % by the pan solids method (heating approximately 1 gram of sample in an aluminum dish at 120° C. for 2–3 hours). The material had an acid number of 27 mg KOH/g material (by titration). The amount of hydroxyl groups, after correcting for the acidity of the product, was 3.9 weight %. By High Pressure Size Exclusion Chromatography (HPSEC), the number average molecular weight of the product was 7090 (relative to a polystyrene standard) with a polydispersity of 2.8.

EXAMPLE 2

Preparation of Acrylic Resin in Arcosolv® PM Acetate

A propylene glycol monomethyl ether acetate (available from Arco Chemical Co. under the trade designation Arcosolve® PM Acetate) (655 g) was added to a 5 liter reactor equipped with a stirrer, a reflux condenser, and a thermocouple under a blanket of nitrogen and heated in an oil bath to 90° C. A monomer feed mixture (1725 g total) consisting of butyl acrylate (48.38 wt %), 2-hydroxyethyl acrylate (21.07 wt %), methyl methacrylate (20.46 wt %), acrylic acid (6.16 wt %), 2,2'-azobis-2-methylbutyronitrile (2.97 wt %), and 1-octanethiol (0.96 wt %) was added to the reactor using a piston metering pump over a period of 235 minutes. During this period, the temperature of the reaction mixture reached a maximum of 101° C. After an additional 40 minutes, 10.3 g of a 20 wt % solution of 2,2'-azobis-2-methylbutyronitrile in urethane grade propylene glycol monomethyl ether acetate was charged and the reaction mixture was stirred at a temperature of 92° C. to 98° C. for an additional 86 minutes to produce a carboxy-functional isocyanate reactive material as the reaction product. The solids content of the product was 72.0 wt % by the pan solids method (heating 1.00 g of sample in an aluminum dish at 105° C. for 1 hour). The material had an acid number of 28 mg KOH/g resin (by titration). The amount of hydroxyl groups, after correcting for the acidity of the product, was 3.5 wt % (100% solids basis). By High Pressure Size Exclusion Chromatography (HPSEC), the number averaged molecular weight of the product was 7,200 relative to a polystyrene standard, with a polydispersity of 2.5.

EXAMPLE 3

Waterborne coating formulations were prepared from the acrylic resin prepared as in Example 2 and tris-(butoxycarbonylamino)-1,3,5-triazine as crosslinker, using three different potential aqueous dispersion-promoting materials—methoxy isopropanol, n-butanol and Texanol® ester-alcohol. The formulations were prepared as follows. The acrylic resin, crosslinker and potential aqueous dispersion-promoting material were mixed together to form a clear solution, to which was then added the triethylamine. The resulting material was then dispersed in water with mixing. The appearance immediately after preparation was observed, and the time required to form a noticeable precipitate was measured. The formulations and results are shown in Table 1.

TABLE 1

| Ingredients | Formulation/Amounts (grams) | | |
| --- | --- | --- | --- |
|  | A | B | C |
| Acrylic Resin | 10.2 | 10.2 | 10.2 |
| TBCT, 100% NV | 2.1 | 2.1 | 2.1 |
| Methoxy Isopropanol | 2.1 | 0 | 0 |
| n-Butanol | 0 | 2.1 | 0 |
| Texanol ® Ester-Alcohol | 0 | 0 | 2.1 |
| Triethylamine | 0.45 | 0.45 | 0.45 |
| Water | 25 | 25 | 25 |
| Appearance |  |  |  |
| Immed. after mixing | Clear | Clear | Clear |
| Precip. formed | 1 hour | 2 hours | 1 month |

As shown above, the pot life of the waterborne coatings of the present invention can be varied by the use of certain additives. Specifically, the longest potlife was achieved with the Texanol® ester-alcohol, which is a preferred aqueous dispersion-promoting material as described above.

EXAMPLE 4

Waterborne coating formulation D was prepared using the procedure described in Example 3 from the following components:

| Ingredients | Amounts (grams) |
| --- | --- |
| Acrylic Resin (Ex.2) | 107.7 |
| Tris-(butoxycarbonylamino)-1,3,5-triazine, 70% in n-butanol | 32.1 |
| Triethylamine | 4.3 |
| Water | 239 |
| FC-430* | 1.0 |

*FC-430 is a fluorocarbon flow control agent available from 3M, St. Paul, MN. It was used as a 10% solution in a 50/50 mixture of methoxy isopropanol acetate/methyl ethyl keytone.

Waterborne coating formulation D was separately coated by wire cater applicator onto two Bondrite® 100 treated cold rolled steel panels (Advanced Coating Technologies, Inc., Hillsdale, Mich.), and cured for 30 minutes at either 125° C. or 140° C., respectively. The resulting films were tested for hardness and solvent resistance. Solvent resistance was measured by methyl ethyl ketone (MEK) double rubs "to mar" and "to remove" the coating. Highly crosslinked coatings require 200+ (i.e., more than 200) MEK rubs to mar. When two values are shown (/), the first is the number of rubs to mar and the second, to remove, the coating. When only one value is shown, the coating did not mar and the number shown is the number of rubs to remove it. The results are shown in Table 2.

TABLE 2

|  | 125° C. | 140° C. |
| --- | --- | --- |
| Film Thickness, mils | 0.9 | 0.9 |
| Film Hardness, KHN25 | 12.2 | 12.1 |
| Film Hardness, pencil | 2H–3H | 2H–3H |
| MEK Rubs, to Mar/Remove | 200/200+ | 200+ |

As can be seen from the results, hard resistant films are obtainable from the waterborne coating composition in accordance with the present invention.

EXAMPLE 5

Waterborne coating formulations E, F and G, based upon the acrylic resin of example 2 and tris-(butoxycarbonylamino)-1,3,5-triazine as crosslinker, with additional components shown in Table 3 below, were prepared by first forming a clear solution by blending the components (other than the triethylamine and water) then, once the components were blended, adding the triethylamine and dispersing the resulting material in water.

TABLE 3

| Ingredients | Formulation/Amounts (grams) | | |
| --- | --- | --- | --- |
|  | E | F | G |
| Acrylic Resin (Ex. 2) | 31.7 | 0 | 33.5 |
| Crosslinker, 100% NV | 7.2 | 0 | 0 |
| Hexanol | 7.2 | 0 | 0 |
| Cymel ® 303 Resin | 0 | 9.2 | 0 |
| Cymel ® 325 Resin | 0 | 0 | 11.5 |
| Cycat ® 4045 | 0 | 0.6 | 0 |
| n-Butanol | 0 | 2.3 | 0 |
| Triethylamine | 1.6 | 1.9 | 1.9 |
| Water | 100 | 90 | 85 |

Cymel® 303 resin is a highly methylated melamine-formaldehyde resin and Cymel® 325 resin is a high imino (—NH) functional melamine-formaldehyde resin, both commercially available from CYTEC Industries Inc., West Paterson, N.J. Cycat® 4045 is an amine-blocked p-toluene sulfonic acid, commercially available form CYTEC Industries Inc., West Paterson, N.J.

Soon after preparation, coating formulations E, F and G were separately applied as a top coat using a Gardner Film Casting Knife onto base-coated ED-5000 primed cold rolled steel panels (Advanced Coating Technologies, Inc., Hillsdale, Mich.), and then cured at 125° C. for 30 minutes. The base coat was a white-pigmented (TiO$_2$) acrylic resin (commercially available under the trade designation Acryloid® AT-400 of Rohm&Haas, Philadelphia, Pa.) crosslinked with CYMEL® 325 amino resin crosslinker. The base coat was cured at 90° C. for 20 minutes, and each had a thickness of 1.0–1.1 mils. The properties of the resulting top coated panels are shown in Table 4. In addition, these panels were subject to advanced weathering tests, with the tests and results also shown in Table 4.

TABLE 4

|  |  | E | F | G |
|---|---|---|---|---|
| Coating Performance |  |  |  |  |
| Thickness |  | 1.0 | 1.2 | 1.2 |
| KHN$_{25}$ Hardness |  | 12.4 | 4.0 | 9.9 |
| Pencil Hardness |  | 2H–3H | H–2H | 2H–3H |
| MEK Rubs |  | 200+ | 20/200+ | 200+ |
| Cleveland Humidity Resistance (60° C.) |  |  |  |  |
| 20°/60° Gloss, | Original | 85/93 | 94/98 | 89/95 |
|  | After 20 Days | 82/92 | 87/95 | 77/92 |
|  | After 27 Days | 89/96 | 89/96 | 67/90 |
|  | After 38 Days | 85/94 | 85/94 | 6/23 |
| Blistering | After 38 Days | 10 | 10 | 10 |
| QUV Resistance |  |  |  |  |
| 20°/60° Gloss, | Original | 85/93 | 94/98 | 89/95 |
|  | After 1026 Hours | 85/93 | 90/96 | 88/95 |
| Yellowness Index | Original | –4.2 | –3.6 | –3.3 |
|  | After 268 Hours | –3.2 | –3.6 | –2.9 |
|  | After 599 Hours | –2.5 | –3.3 | –2.4 |
|  | After 883 Hours | –2.1 | –3.0 | –2.4 |
|  | After 1026 Hours | –1.9 | –3.0 | –2.0 |

EXAMPLE 6

The procedure of Example 2 was repeated, and the resulting acrylic resin had a solids content of 74.0 wt % by the pan solids method (heating 1.00 g of sample in an aluminum dish at 105° C. for 1 hour), an acid number of 33 mg KOH/g resin (by titration), an amount of hydroxyl groups, after correcting for the acidity of the product, was 3.2 wt % (100% solids basis), an Mn (by HPSEC) of 7,620 relative to a polystyrene standard, and a polydispersity of 3.3.

Coating formulations H and I were prepared in a manner similar to Example 3 from this acrylic resin and, as crosslinker, either tris-(butoxycarbonylamino)-1,3,5-triazine (Crosslinker I) or tris-(butoxy/methoxycarbonylamino)-1,3, 5-triazine (butyl/methyl molar ratio of about 60/40) (Crosslinker II), as well as other ingredients set forth below in Table 5.

Coating formulations H and I were coated onto Bondrite® 1000 cold rolled steel panels ((Advanced Coating Technologies, Inc., Hillsdale, Mich.), then cured at 125° C. for 30 minutes. Properties of the coatings as well as the resulting films are set forth below in Table 5.

TABLE 5

| Ingredients | Formulation/Amounts (grams) | |
|---|---|---|
|  | H | I |
| Acrylic Resin | 21.3 | 21.3 |
| Crosslinker I, 100% NV | 4.2 | 0 |
| Crosslinker II, 100% NV | 0 | 3.8 |
| 2-ethyl-1-hexanol | 4.2 | 3.8 |
| Triethylamine | 1.1 | 1.1 |
| Water | 81 | 80 |
| Appearance |  |  |
| Immed. after mixing | Clear | Clear |
| Precip. formed | >2 days | <2 days |
| Coating Performance |  |  |
| Film Thickness, mils | 0.8 | 0.9 |
| Film Hardness, KHN25 | 12.0 | 11.8 |
| MEK Rubs, to Mar/Remove | 200+ | 200+ |

EXAMPLE 7

Coating formulation J was prepared employing the acrylic resin prepared as in Example 1 and tris-(butoxycarbonylamino)-1,3,5-triazine the a sole crosslinker. Coating formulation K was prepared using the same acrylic resin and crosslinker combined with an alkoxymethylated melamine crosslinking resin, Cymel® 1133, available from CYTEC Industries, West Paterson, N.J. The formulations, their appearance immediately after mixing, and their pot lives are shown in Table 6 below:

TABLE 6

| Ingredients | Formulation/Amounts (grams) | |
|---|---|---|
|  | J | K |
| Acrylic Resin | 12.63 | 12.63 |
| Crosslinker | 1.98 | 1.23 |
| Cymel ® 1133 | 0 | 1.23 |
| Triethylamine | 0.5 | 0.5 |
| Cycat ® 600 | 1.0 | 1.0 |
| Water | 30 | 30 |
| Appearance | Clear | Clear |
| Precip. Formed | >12 days | >12 days |

Cycat ® 600 is a 72 wt % dodecylbenzene sulfonic acid in isopropanol, available from CYTEC Industries, Inc. It was amine-blocked and used as a 10% solution in water.

EXAMPLE 8

The procedure of Example 2 was repeated, and the resulting acrylic resin had a solids content of 74.0 wt % by the pan solids method (heating 1.00 g of sample in an aluminum dish at 105° C. for 1 hour), an acid number of 35 mg KOH/g resin (by titration), an amount of hydroxyl groups, after correcting for the acidity of the product, was 2.4 wt % (100% solids basis), an Mn (by HPSEC) of 7,410 relative to a polystyrene standard, and a polydispersity of 3.1.

Ten coating formulations were prepared in a manner similar to Example 3 from this acrylic resin and, as crosslinker, tris-(butoxycarbonylamino)-1,3,5-triazine, as well as other ingredients in the following amounts:

| Ingredients | Amount (grams) |
|---|---|
| Acrylic Resin | 7.33 |
| Crosslinker | 1.47 |
| Additive | 1.47 |
| Triethylamine | 0.50 |
| Water | 25 |

The ten coatings differed only in the additive used, which were as follows—methanol, ethanol, isopropanol, n-butanol, n-hexanol, ethylhexanol, Texanol® ester alcohol, Arcosolv® PM Acetate, methyl amyl ketone, and 100% urethane diol having a hydroxyl number of 383 (commercially available under the trade designation K-Flex XM- 2304 of King Industries Inc., Norwalk, Conn.). All of the waterborne coatings were clear immediately after mixing, but precipitates formed within two hours in all but the coatings containing ethylhexanol and Texanol® ester alcohol. After overnight aging, these two systems remained clear.

Although the present invention is described with reference to certain preferred embodiments, it is apparent that variations and modifications may be made by those skilled in the art without departing from the scope of this invention as defined by the appended claims.

What is claimed is:

1. A waterborne coating composition comprising an aqueous medium having substantially homogeneously dispersed therein:
   (1) a reactive resin component comprising an active hydrogen-containing surface active resin which possesses sufficient anionic hydrophilizing functionality to render the active hydrogen-containing surface active resin water dispersible;
   (2) a crosslinker component comprising a 1,3,5-triazine carbamate crosslinker; and
   (3) an aqueous dispersion promoting material which is non-polymeric, has a hydrophilic portion, but which in and of itself is substantially hydrophobic.

2. The waterborne coating composition of claim 1, wherein the 1,3,5-triazine carbamate crosslinker is selected from one or more compounds of the following formula, as well as oligomers thereof:

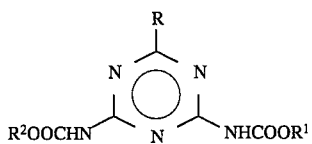

wherein R is selected from the group consisting of —NHCOOR$^3$, hydrogen, hydrocarbyl, hydrocarbyloxy, hydrocarbylthio, amido, sulfonamido, amino hydrocarbylamino, dihydrocarbylamino and cyclic amino; and
each R$^1$, R$^2$ and R$^3$ is independently selected from the group consisting of hydrocarbyl, hydroxyhydrocarbyl, hydrocarbyloxyhydrocarbyl and hydroxyhydrocarbyloxyhydrocarbyl.

3. The waterborne coating composition of claim 1, further comprising a second active hydrogen reactive crosslinking agent.

4. The waterborne coating composition of claim 3, wherein the second active hydrogen reactive crosslinking agent is selected from the group consisting of an amino resin and a polyisocyanate.

5. The waterborne composition of claim 4, wherein the second active hydrogen reactive crosslinking agent is a partially or substantially fully methylolated, partially or substantially fully etherified amino compound based on melamine, guanamines, glycolurils and/or urea.

6. The waterborne coating composition of claim 1, wherein the active hydrogen-containing surface active resin and the 1,3,5-triazine carbamate crosslinker are the primary film-forming components, and are present in amounts such that the carbamate:active hydrogen functionality molar ratio is in the range of from about 0.5:1 to about 2:1.

7. The waterborne coating composition of claim 1, wherein the overall molar ratio of the active hydrogen reactive:active hydrogen functionality in the resin component and the crosslinker component is in the range of from about 0.5:1 to about 2:1.

8. The waterborne coating composition of claim 1, comprising from about 20% to about 75% by weight solids.

9. The waterborne coating composition of claim 1, wherein the aqueous dispersion promoting material is selected from the group consisting of long chain aliphatic alcohols, aromatic alcohols and ester alcohols.

10. The waterborne coating composition of claim 9, wherein the aqueous dispersion promoting material is a long chain aliphatic alcohol having at least 8 carbon atoms.

11. The waterborne coating composition of claim 9, wherein the aqueous dispersion promoting material is a hydroxyalkyl ester of an alkanoic acid having a total of at least 8 carbon atoms.

12. The waterborne coating composition of claim 1, wherein the aqueous dispersion promoting material is present in an amount which does not exceed 40 wt % based on the combined weight of the resin and crosslinker components.

13. The waterborne coating composition of claim 1, which is suitable for application by spraying.

14. A dispersible composition comprising a substantially homogenous mixture of:
   (1) a reactive resin component comprising an active hydrogen-containing surface active resin which possesses an amount of anionic hydrophilizing functionality sufficient to render the dispersible composition water dispersible,
   (2) a crosslinker component comprising a 1,3,5-triazine carbamate crosslinker, and
   (3) an aqueous dispersion promoting material which is non-polymeric, has a hydrophilic portion, but which in and of itself is substantially hydrophobic.

15. A waterborne coating composition comprising an aqueous medium having a dispersible composition substantially homogeneously dispersed therein, the dispersible composition comprising a substantially homogenous mixture of:
   (1) a reactive resin component comprising an active hydrogen-containing surface active resin which possesses an amount of anionic hydrophilizing functionality sufficient to render the dispersible composition water dispersible,
   (2) a crosslinker component comprising a 1,3,5-triazine carbamate crosslinker, and
   (3) an aqueous dispersion promoting material which is non-polymeric, has a hydrophilic portion, but which in and of itself is substantially hydrophobic.

16. A method of preparing a waterborne coating composition comprising the steps of:
   (A) preparing a dispersible composition by substantially homogeneously mixing
      (1) a reactive resin component comprising an active hydrogen-containing surface active resin possessing an amount of anion generating functionality which, upon neutralization, is sufficient to render the dispersible composition water dispersible,
      (2) a crosslinker component comprising a 1,3,5-triazine carbamate crosslinker, and
      (3) an aqueous dispersion promoting material which is non-polymeric, has a hydrophilic portion, but which in and of itself is substantially hydrophobic; and
   (B) dispersing the dispersible composition in an aqueous medium,
whereby prior to or concurrently with step (B), the anion generating functionality on the active hydrogen-containing surface active resin is sufficiently neutralized so as to render the dispersible composition water dispersible.

17. A method of coating a substrate comprising the steps of:
   (A) applying to the substrate a waterborne coating composition comprising an aqueous medium having substantially homogeneously dispersed therein:
      (1) a reactive resin component comprising an active hydrogen-containing surface active resin which possesses sufficient anionic hydrophilizing functionality to render the active hydrogen-containing surface active resin water dispersible, (2) a crosslinker component comprising a 1,3,5-triazine carbamate crosslinker, and (3) an aqueous dispersion promoting material which is non-polymeric, has a hydrophilic portion, but which in and of itself is substantially hydrophobic; and (B) curing the so-applied coating.

18. A substrate coated with a cured film derived from a waterborne coating composition comprising an aqueous medium having substantially homogeneously dispersed therein:

(1) a reactive resin component comprising an active hydrogen-containing surface active resin which possesses sufficient anionic hydrophilizing functionality to render the active hydrogen-containing surface active resin water dispersible, (2) a crosslinker component comprising a 1,3,5-triazine carbamate crosslinker, and (3) an aqueous dispersion promoting material which is non-polymeric, has a hydrophilic portion, but which in and of itself is substantially hydrophobic.

19. The dispersible composition of claim 14, wherein the 1,3,5-triazine carbamate crosslinker is selected from one or more compounds of the following formula, as well as oligomers thereof:

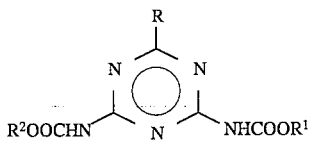

wherein R is selected from the group consisting of —NHCOOR$^3$, hydrogen, hydrocarbyl, hydrocarbyloxy, hydrocarbylthio, amido, sulfonamido, amino hydrocarbylamino, dihydrocarbylamino and cyclic amino; and each R$^1$, R$^2$ and R$^3$ is independently selected from the group consisting of hydrocarbyl, hydroxyhydrocarbyl, hydrocarbyloxyhydrocarbyl and hydroxyhydrocarbyloxyhydrocarbyl.

20. The dispersible composition of claim 14, further comprising a second active hydrogen reactive crosslinking agent.

21. The dispersible composition of claim 20, wherein the second active hydrogen reactive crosslinking agent is selected from the group consisting of an amino resin and a polyisocyanate.

22. The dispersible composition of claim 14, wherein the overall molar ratio of the active hydrogen reactive:active hydrogen functionality in the resin component and the crosslinker component is in the range of from about 0.5:1 to about 2:1.

23. The dispersible composition of claim 14, wherein the aqueous dispersion promoting material is selected from the group consisting of long chain aliphatic alcohols, aromatic alcohols and ester alcohols.

24. The dispersible composition of claim 23, wherein the aqueous dispersion promoting material is a long chain aliphatic alcohol having at least 8 carbon atoms.

25. The dispersible composition of claim 23, wherein the aqueous dispersion promoting material is a hydroxyalkyl ester of an alkanoic acid having a total of at least 8 carbon atoms.

26. The dispersible composition of claim 14, wherein the aqueous dispersion promoting material is present in an amount which does not exceed 40 wt % based on the combined weight of the resin and crosslinker components.

27. The waterborne coating composition of claim 15, wherein the 1,3,5-triazine carbamate crosslinker is selected from one or more compounds of the following formula, as well as oligomers thereof:

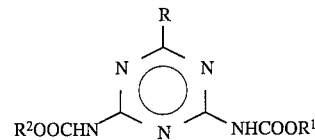

wherein R is selected from the group consisting of —NHCOOR$^3$, hydrogen, hydrocarbyl, hydrocarbyloxy, hydrocarbylthio, amido, sulfonamido, amino hydrocarbylamino, dihydrocarbylamino and cyclic amino; and each R$^1$, R$^2$ and R$^3$ is independently selected from the group consisting of hydrocarbyl, hydroxyhydrocarbyl, hydrocarbyloxyhydrocarbyl and hydroxyhydrocarbyloxyhydrocarbyl.

28. The waterborne coating composition of claim 15, wherein the crosslinker component further comprises a second active hydrogen reactive crosslinking agent.

29. The waterborne coating composition of claim 28, wherein the second active hydrogen reactive crosslinking agent is selected from the group consisting of an amino resin and a polyisocyanate.

30. The waterborne coating composition of claim 15, wherein the overall molar ratio of the active hydrogen reactive:active hydrogen functionality in the resin component and the crosslinker component is in the range of from about 0.5:1 to about 2:1.

31. The waterborne coating composition of claim 15, comprising from about 20% to about 75% by weight solids.

32. The waterborne coating composition of claim 15, wherein the aqueous dispersion promoting material is selected from the group consisting of long chain aliphatic alcohols, aromatic alcohols and ester alcohols.

33. The waterborne coating composition of claim 32, wherein the aqueous dispersion promoting material is a long chain aliphatic alcohol having at least 8 carbon atoms.

34. The waterborne coating composition of claim 32, wherein the aqueous dispersion promoting material is a hydroxyalkyl ester of an alkanoic acid having a total of at least 8 carbon atoms.

35. The waterborne coating composition of claim 15, wherein the aqueous dispersion promoting material is present in an amount which does not exceed 40 wt % based on the combined weight of the resin and crosslinker components.

36. The waterborne coating composition of claim 15, which is suitable for application by spraying.

37. The method of claim 17, wherein the aqueous dispersion promoting material is selected from the group consisting of long chain aliphatic alcohols, aromatic alcohols and ester alcohols.

38. The method of claim 32, wherein the aqueous dispersion promoting material is a long chain aliphatic alcohol having at least 8 carbon atoms.

39. The method of claim 38, wherein the aqueous dispersion promoting material is a hydroxyalkyl ester of an alkanoic acid having a total of at least 8 carbon atoms.

40. The coated substrate of claim 18, wherein the aqueous dispersion promoting material is selected from the group consisting of long chain aliphatic alcohols, aromatic alcohols and ester alcohols.

41. The coated substrate of claim 40, wherein the aqueous dispersion promoting material is a long chain aliphatic alcohol having at least 8 carbon atoms.

42. The coated substrate of claim 41, wherein the aqueous dispersion promoting material is a hydroxyalkyl ester of an alkanoic acid having a total of at least 8 carbon atoms.

43. The method of claim 16, wherein the 1,3,5-triazine carbamate crosslinker is selected from one or more compounds of the following formula, as well as oligomers thereof:

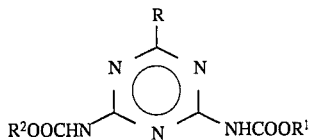

wherein R is selected from the group consisting of —NHCOOR³, hydrogen, hydrocarbyl, hydrocarbyloxy, hydrocarbylthio, amido, sulfonamido, amino hydrocarbylamino, dihydrocarbylamino and cyclic amino; and each R¹, R² and R³ is independently selected from the group consisting of hydrocarbyl, hydroxyhydrocarbyl, hydrocarbyloxyhydrocarbyl and hydroxyhydrocarbyloxyhydrocarbyl.

44. The method of claim 16, wherein the aqueous dispersion promoting material is selected from the group consisting of long chain aliphatic alcohols, aromatic alcohols and ester alcohols.

45. The method of claim 44, wherein the aqueous dispersion promoting material is a long chain aliphatic alcohol having at least 8 carbon atoms.

46. The method of claim 44, wherein the aqueous dispersion promoting material is a hydroxyalkyl ester of an alkanoic acid having a total of at least 8 carbon atoms.

47. The method of claim 17, wherein the 1,3,5-triazine carbamate crosslinker is selected from one or more compounds of the following formula, as well as oligomers thereof:

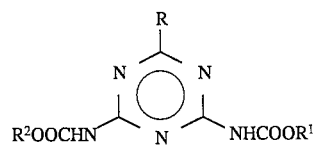

wherein R is selected from the group consisting of —NHCOOR³, hydrogen, hydrocarbyl, hydrocarbyloxy, hydrocarbylthio, amido, sulfonamido, amino hydrocarbylamino, dihydrocarbylamino and cyclic amino; and each R¹, R² and R³ is independently selected from the group consisting of hydrocarbyl, hydroxyhydrocarbyl, hydrocarbyloxyhydrocarbyl and hydroxyhydrocarbyloxyhydrocarbyl.

48. The coated substrate of claim 18, wherein the 1,3,5-triazine carbamate crosslinker is selected from one or more compounds of the following formula, as well as oligomers thereof:

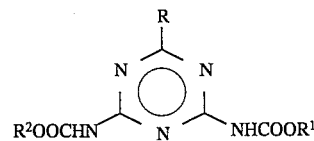

wherein R is selected from the group consisting of —NHCOOR³, hydrogen, hydrocarbyl, hydrocarbyloxy, hydrocarbylthio, amido, sulfonamido, amino hydrocarbylamino, dihydrocarbylamino and cyclic amino; and each R¹, R² and R³ is independently selected from the group consisting of hydrocarbyl, hydroxyhydrocarbyl, hydrocarbyloxyhydrocarbyl and hydroxyhydrocarbyloxyhydrocarbyl.

* * * * *